United States Patent
Lee et al.

(10) Patent No.: US 9,162,395 B2
(45) Date of Patent: Oct. 20, 2015

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Yang-Teh Lee, New Taipei (TW); Yi-Chin Tang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 88 days.

(21) Appl. No.: 14/217,489

(22) Filed: Mar. 18, 2014

(65) Prior Publication Data
US 2015/0165694 A1 Jun. 18, 2015

(30) Foreign Application Priority Data
Dec. 13, 2013 (TW) .............................. 102146227 A

(51) Int. Cl.
*B29C 67/00* (2006.01)
*B29C 47/06* (2006.01)
*B29K 101/00* (2006.01)
*B29L 9/00* (2006.01)
*B33Y 30/00* (2015.01)

(52) U.S. Cl.
CPC ............. *B29C 67/0096* (2013.01); *B29C 47/06* (2013.01); *B29C 67/0059* (2013.01); *B29K 2101/00* (2013.01); *B29L 2009/00* (2013.01); *B33Y 30/00* (2014.12)

(58) Field of Classification Search
CPC ............ B29C 67/0055; B29C 67/0059; B29C 67/0096; B29C 45/24; B29C 47/0877; B29C 47/0879; B08B 1/002; B08B 9/36
USPC ......... 425/225, 226, 227, 228, 229, 230, 231, 425/232; 264/39
See application file for complete search history.

(56) References Cited

U.S. PATENT DOCUMENTS

| | | | | |
|---|---|---|---|---|
| 2,439,993 | A * | 4/1948 | Svensson | 425/227 |
| 5,121,329 | A * | 6/1992 | Crump | 700/119 |
| 5,764,521 | A * | 6/1998 | Batchelder et al. | 700/196 |
| 5,816,466 | A * | 10/1998 | Seufer | 226/187 |
| 6,085,957 | A * | 7/2000 | Zinniel et al. | 226/8 |
| 6,129,872 | A * | 10/2000 | Jang | 264/75 |
| 6,547,995 | B1 * | 4/2003 | Comb | 264/40.1 |
| 6,685,866 | B2 * | 2/2004 | Swanson et al. | 264/308 |
| 6,722,872 | B1 * | 4/2004 | Swanson et al. | 425/225 |
| 6,866,807 | B2 * | 3/2005 | Comb et al. | 264/255 |
| 7,182,588 | B2 * | 2/2007 | Lambauer et al. | 425/101 |
| 7,384,255 | B2 * | 6/2008 | LaBossiere et al. | 425/190 |

* cited by examiner

*Primary Examiner* — Timothy Kennedy
(74) *Attorney, Agent, or Firm* — Jianq Chyun IP Office

(57) ABSTRACT

A 3-D printing apparatus is configured to make a modeling material form a 3-D object layer by layer. The 3-D printing apparatus includes a printing assembly and a cleaning unit. The printing assembly includes a feeding tube, a nozzle and a driving wheel set disposed between the feeding tube and the nozzle to drive the modeling material transferred to the nozzle from the feeding tube and then exiting from the printing assembly via the nozzle so as to form a 3-D object layer by layer. The cleaning unit has a brush, in which the brush leans against on the driving wheel set to clean out the residual modeling material while the driving wheel set rotates relatively to the cleaning unit.

9 Claims, 4 Drawing Sheets

THREE-DIMENSIONAL PRINTING APPARATUS

CROSS-REFERENCE TO RELATED APPLICATION

This application claims the priority benefit of Taiwan application serial no. 102146227, filed on Dec. 13, 2013. The entirety of the above-mentioned patent application is hereby incorporated by reference herein and made a part of this specification.

BACKGROUND

1. Technical Field

The technical field generally relates to a printing apparatus, and more particularly, to a three-dimensional printing apparatus (3-D printing apparatus).

2. Description of Related Art

Along with the progress of computer-aided manufacturing (CAM), the manufacturing industry has developed a brand-new printing technique, the 3-D printing technique, which is able to quickly make an initial design idea into a fabricated object. In fact, the 3-D printing technique is a collective term of a series of rapid prototyping techniques (RP techniques) based on a lamination fabrication, where the cross-sectional layers with different shapes of a work piece are produced by an RP machine through scanning with the X-Y plane in association with stepped displacements in a layer thickness by a layer thickness so as to finally form a 3-D object. The 3-D printing technique has no limitation of geometric shape. The more complicate a part is, the more excellent the RP technique performs. In addition, the RP technique can largely save labor and process time so that it can truly make a digital 3-D model information designed by a 3-D computer-aided design (CAD) software in present under a shortest time requirement, wherein, the digital 3-D model, not only, can be touched, but also its geometric curves can be felt, even the user can trial the assembling performance of a part and conduct the possible function test.

Currently, many methods of forming a plurality of thin cross-sectional layers. For example, a printing head can move in X-Y coordinates on a base according to the X-Y-Z coordinate values established by the design data of a 3-D model, and meanwhile, a modeling material is sprayed out to produce layers with correct cross-sectional shapes. Then, the deposited material gets naturally hardened or cured by using, for example, a strong light source so as to form the required cross-sectional layers, followed by curing layer by layer to form a 3-D object. The forming approach is different depending on the material property. For example, for a fusing/softening plastic material to serve as the "ink" of the 3-D printing, the RP technique can adopt, for example, the selective laser sintering (SLS) and the fused deposition modeling (FDM).

Since the aforementioned spraying printing head is mostly composed of a gear set, tubes and a nozzle, so that the fused or softened modeling material easily remains at the gapped places. Once the modeling material is cured, the residual modeling material will be choked therein to affect the subsequent normal operation of the parts.

SUMMARY

Accordingly, the exemplary embodiment is directed to a 3-D printing structure having parts able to self-clean residue.

The 3-D printing apparatus of the exemplary embodiment is configured to form a 3-D object layer by layer with a modeling material. The 3-D printing apparatus includes a printing assembly and a cleaning unit. The printing assembly includes a feeding tube, a nozzle and a driving wheel set disposed therebetween. The driving wheel set drives the modeling material transferred to the nozzle from the feeding tube and then exiting from the printing assembly via the nozzle so as to form a 3-D object layer by layer. The cleaning unit has a brush, in which the brush leans against and contact with the driving wheel set to clean out the residual modeling material while the driving wheel set rotates relatively to the cleaning unit.

In an exemplary embodiment, the above-mentioned driving wheel set includes a first power source, an active wheel and a passive wheel. The first power source is connected to the active wheel. The passive wheel is coupled to the active wheel, in which the first power source drives the active wheel for rotation, so that the active wheel drives the passive wheel for rotation and transfers the modeling material to the nozzle from the feeding tube.

In an exemplary embodiment, a rotation direction of the above-mentioned active wheel is opposite to a rotation direction of the passive wheel.

In an exemplary embodiment, the above-mentioned cleaning unit is disposed beside the passive wheel and the brush leans against and contact with the passive wheel.

In an exemplary embodiment, the above-mentioned cleaning unit includes a worm gear, which is freely coupled to the active wheel or the passive wheel, in which the brush is disposed on a surface of the worm gear or in a helical tooth groove of the worm gear, and the brush leans against the active wheel or the passive wheel to clean out the residual modeling material on the active wheel or the passive wheel.

In an exemplary embodiment, the above-mentioned cleaning unit includes a second power source and a worm gear. The worm gear is connected to the second power source, in which the worm gear is coupled to the active wheel or the passive wheel, the brush is disposed on a surface of the worm gear or in a helical tooth groove of the worm gear, when the first power source is not active, the second power source drives the worm gear for rotation to further drive the active wheel or the passive wheel and the brush cleans out the residual modeling material on the active wheel or the passive wheel.

In an exemplary embodiment, a rotation axis of the above-mentioned worm gear is orthogonal to a rotation axis of the active wheel or the passive wheel.

In an exemplary embodiment, the above-mentioned 3-D printing apparatus further includes a heating unit thermally coupled to the feeding tube to fuse or soften the modeling material in the feeding tube.

Based on the aforementioned depiction, in the above-mentioned embodiments of the 3-D printing apparatus, by using the cleaning unit disposed beside the printing assembly with a brush able to lean against the driving wheel set, the brush can clean out the residual modeling material thereon during rotation of the driving wheel set, which further effectively avoids the situation that the residual modeling material after curing is choked in the printing assembly to trigger abnormal operation.

In order to make the features and advantages of the present invention more comprehensible, the present invention is further described in detail in the following with reference to the embodiments and the accompanying drawings.

DESCRIPTION OF THE EMBODIMENTS

Figure 1:
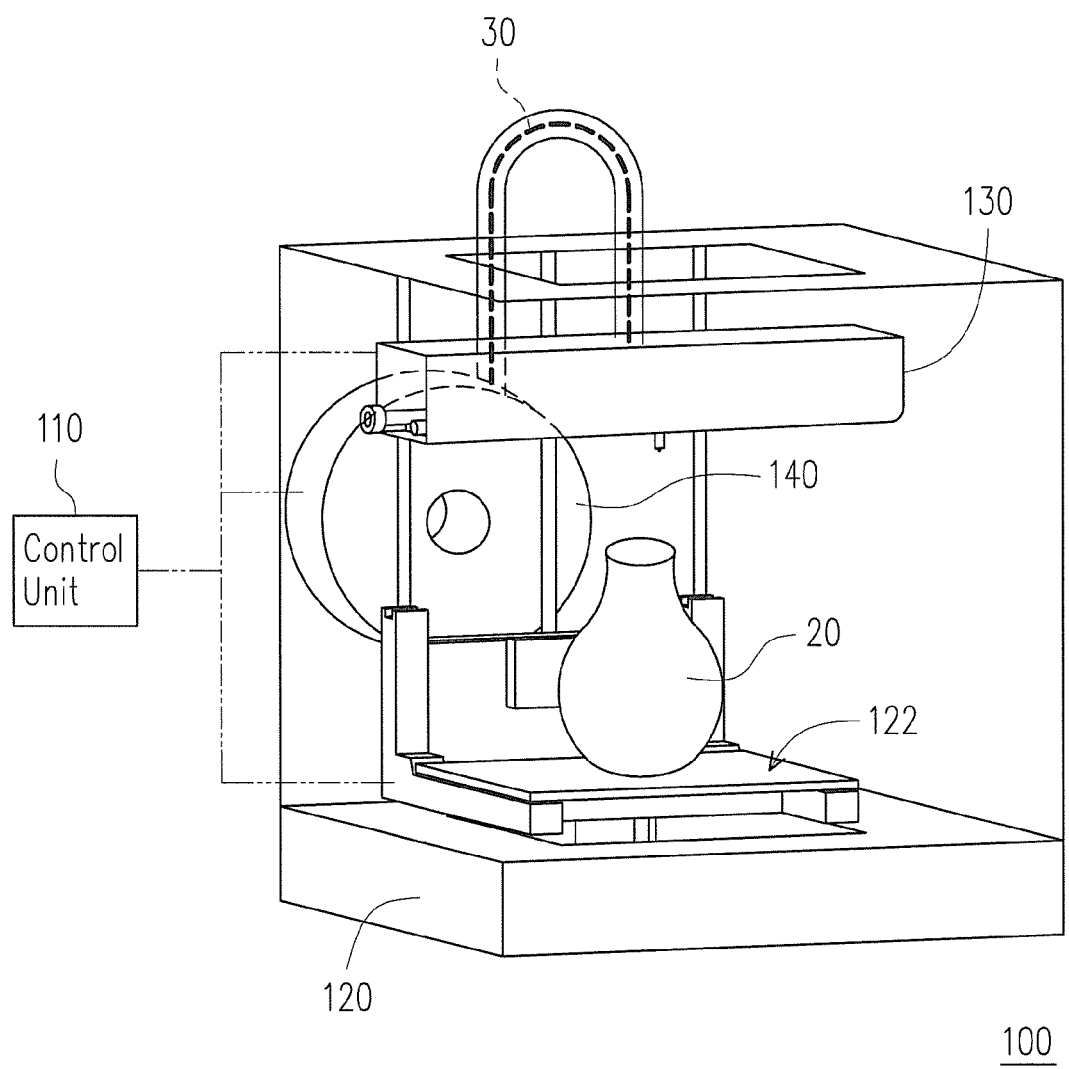
FIG. 1 is a schematic diagram of a 3-D printing apparatus according to an exemplary embodiment.
Figure 2:
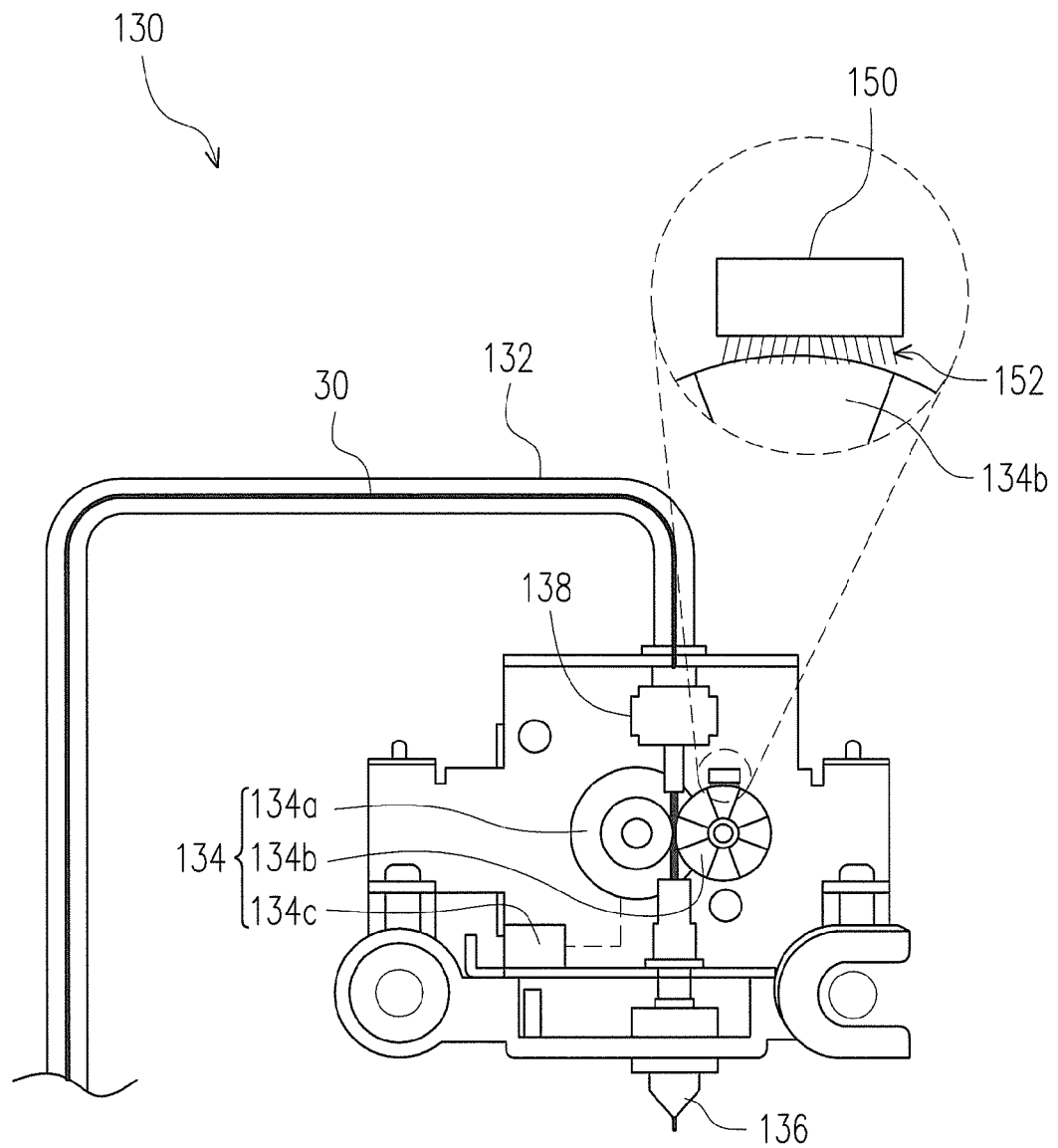
FIG. 2 is a diagram of partial parts of the 3-D printing apparatus in FIG. 1.

FIG. 1 is a schematic diagram of a 3-D printing apparatus according to an exemplary embodiment and FIG. 2 is a diagram of partial parts of the 3-D printing apparatus in FIG. 1. Referring to FIGS. 1 and 2, in the embodiment, the 3-D printing apparatus 100 is suitable to form (print out) a 3-D object 20 according to a digital 3-D model information. The 3-D printing apparatus 100 includes a control unit 110, a base 120 and a printing assembly 130. In the embodiment, the digital 3-D model information can be a digital 3-D image file established by, for example, a computer host through a computer-aided design (CAD) or an animation modelling software. The control unit 110 can read and process the digital 3-D model information, followed by driving the printing assembly 130 to 3-D print out a 3-D object 20 layer by layer on the base 120.

The base 120 has a carrying surface 122 to carry the meltable material sprayed out by the printing assembly 130. In the embodiment, the 3-D printing apparatus 100 further includes at least one feeding unit 140 to provide the modeling material 30 coupled to the printing assembly 130. The printing assembly 130 is disposed over the base 120. The control unit 110 is coupled to and controls the printing assembly 130 to form the modeling material onto the carrying surface 122 of the base 120 layer by layer so as to finally form the 3-D object 20.

Specifically, the modeling material 30 in the embodiment are solid spools composed by meltable material. In the embodiment, the meltable material can be, for example, a meltable polymer material such as polylactic acid (PLA) or acrylonitrile butadiene styrene (ABS).

The printing assembly 130 includes a feeding tube 132, a driving wheel set 134, a nozzle 136 and a heating unit 138. The feeding tube 132 is connected to the feeding unit 140 to receive the provided modeling material 30. The heating unit 138 is thermally coupled to the feeding tube 132 to fuse or soften the modeling material 30 in the feeding tube 132, so that the driving wheel set 134 squeezes and transfers the softened/fused modeling material 30 into the nozzle 136 followed by exiting from the printing assembly 130. At the time, the modeling material 30 can be sprayed onto the carrying surface 122 from the nozzle 136.

In the embodiment, the driving wheel set 134 includes a first power source 134c, an active wheel 134a and a passive wheel 134b. The first power source 134c herein is, for example, a motor electrically connected to the control unit 110. The active wheel 134a and the passive wheel 134b are respectively a gear, wherein the active wheel 134a is connected to the first power source 134c and the passive wheel 134b is coupled to the active wheel 134a. Thus, the control unit 110 can drive the active wheel 134a for rotation through the first power source 134c. Then, the active wheel 134a drives the passive wheel 134b. A rotation direction of the active wheel 134a is opposite to a rotation direction of the passive wheel 134b. As a result, the softened/fused modeling material 30 can be transferred to the nozzle 136 under the associated rotations of the active wheel 134a and the passive wheel 134b and then is sprayed onto the base 120 from the nozzle 136.

Since the softened/fused modeling material 30 is transferred under a driving force supplied by the aforementioned driving wheel set 134, the softened/fused modeling material 30 is relatively easier to be adhered on the driving wheel set 134. After the softened/fused modeling material 30 is cured, it likely forms a residual modeling material choked therein. In order to avoid such case, the 3-D printing apparatus 100 further includes a cleaning unit 150 having a brush 152 leaning against and contact with the driving wheel set 134. In the embodiment, taking an example first, the brush 152 leans against and contact with the passive wheel 134b. When the passive wheel 134b is driven by the active wheel 134a for rotation, the brush 152 of the cleaning unit 150 would clean the residual modeling material adhered on the passive wheel 134b so as to remove the residual modeling material on the passive wheel 134b.

In another embodiment (which is not shown here), the cleaning unit can be disposed at another side of the path where the modeling material travels through, i.e., the brush leans against and contact with the active wheel 134a so as to clean out the residual modeling material on the active wheel 134a.

Figure 3:
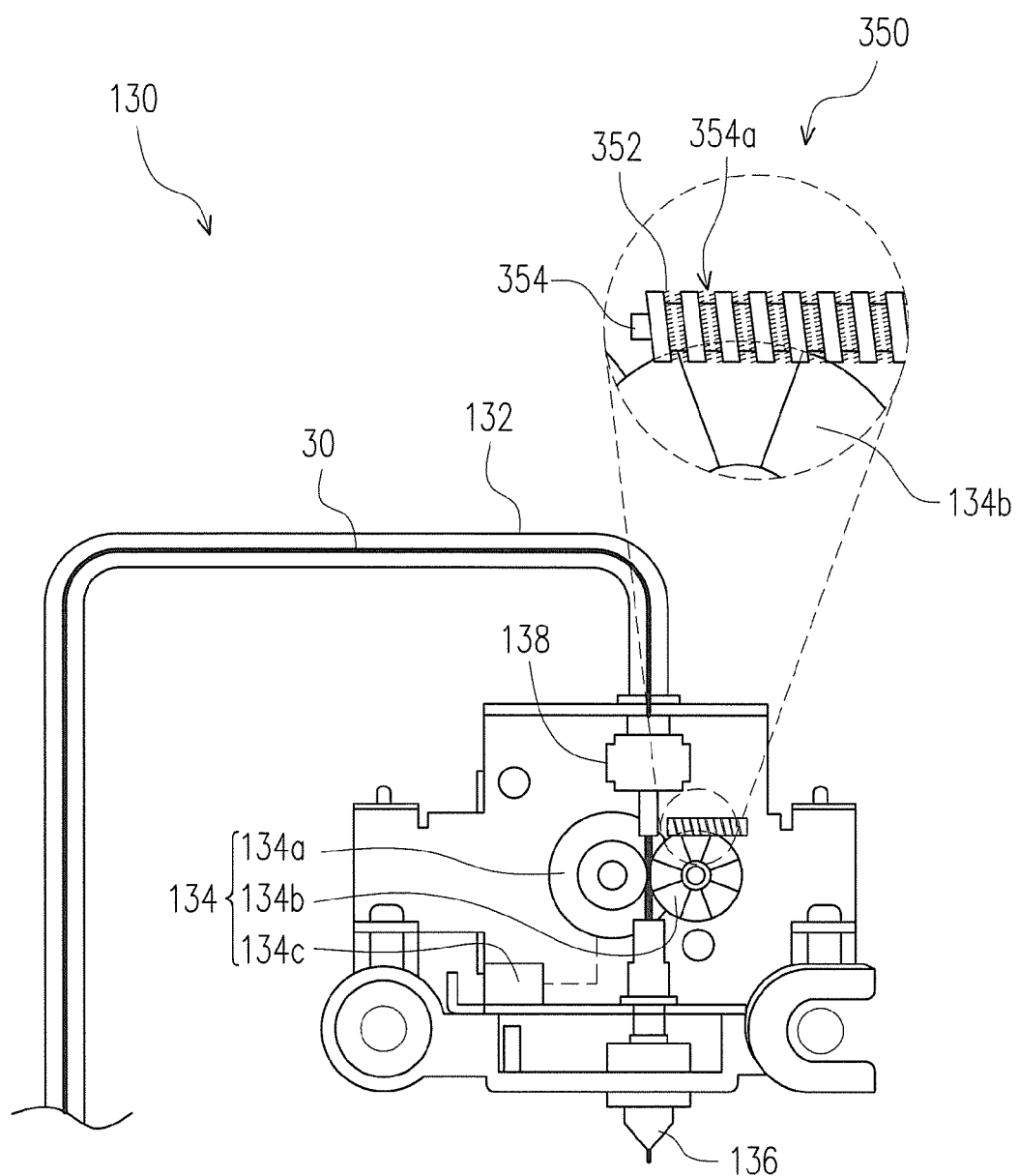
FIG. 3 is a diagram of partial parts of a 3-D printing apparatus according to another exemplary embodiment.

FIG. 3 is a diagram of partial parts of a 3-D printing apparatus according to another exemplary embodiment. Referring to FIG. 3, the difference from the aforementioned embodiment is that the cleaning unit 350 of the embodiment includes a worm gear 354 and a brush 352, in which the worm gear 354 is freely coupled to the passive wheel 134b and a rotation axis of the worm gear 354 is orthogonal to a rotation axis of the passive wheel 134b. The brush 352 is disposed in a helical tooth groove 354a of the worm gear 354. In more details, when the passive wheel 134b rotates, as depicted above, the active wheel 134a drives the passive wheel 134b so as to further make the worm gear 354 rotate. At the time, the worm gear 354 and the passive wheel 134b are engaged, and the brush 352 leans against and contact with the helical tooth groove 354a of the passive wheel 134b to clean out the residual modeling material therein.

Figure 4:
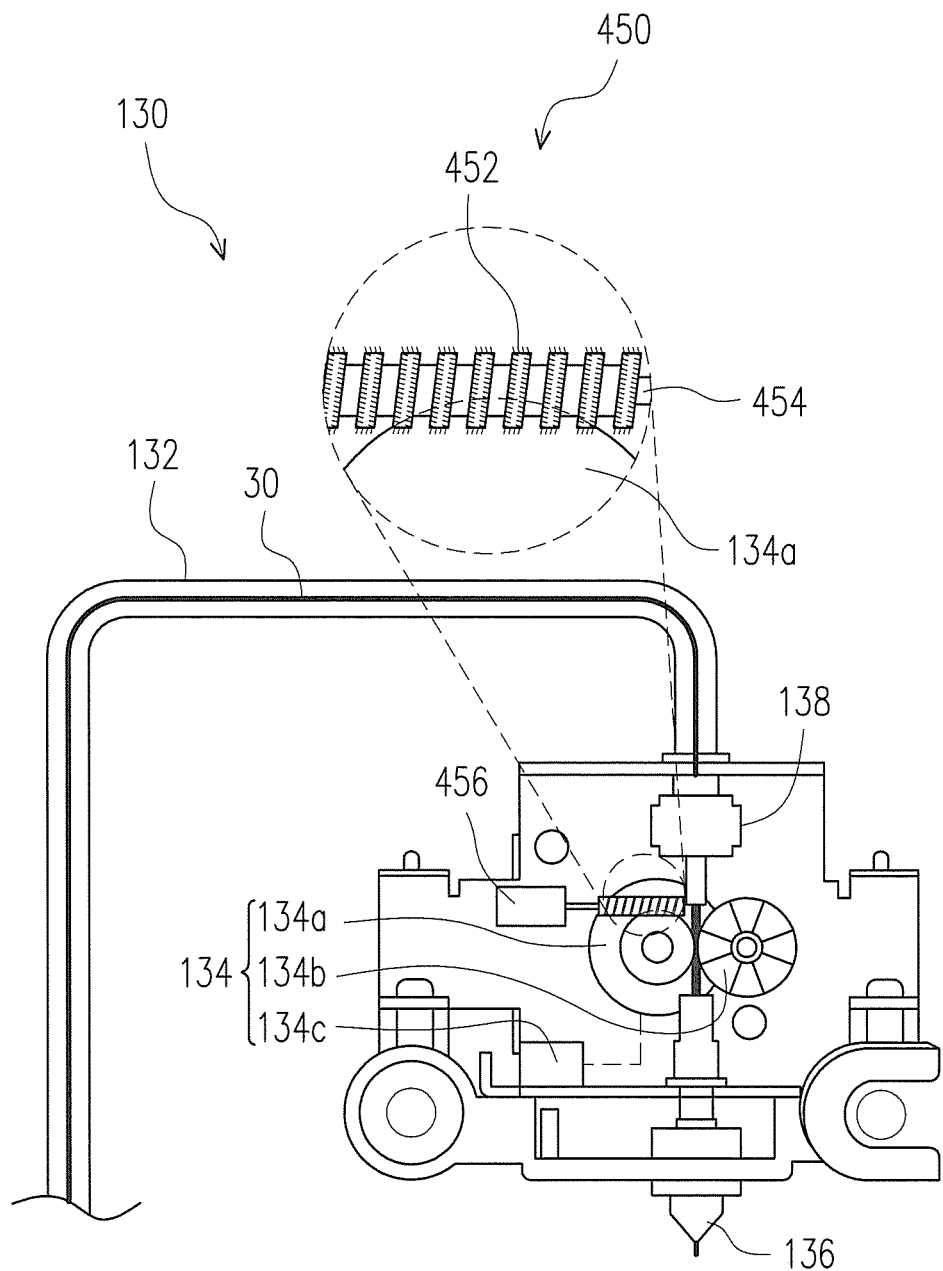
FIG. 4 is a diagram of partial parts of a 3-D printing apparatus according to yet another exemplary embodiment.

FIG. 4 is a diagram of partial parts of a 3-D printing apparatus according to yet another exemplary embodiment. Referring to FIGS. 4 and 3, the difference from the embodiment of FIG. 3 is the cleaning unit 450 of FIG. 4 includes a worm gear 454, a brush 452 and a second power source 456. The second power source 456 is, for example, a motor. The worm gear 454 is connected to the second power source 456 and coupled to the active wheel 134a. The brush 452 is disposed on a surface of the worm gear 454. When the active wheel 134a does not receive power from the first power source 134c, or in which the first power source 134C is not active, the active wheel 134a is in a free pivoting state (such state can be implemented by the driving wheel set through appropriate gear link design or clutch design according to the current technology). At the time, the second power source 456 provides the worm gear 454 with a power, so that the worm gear 454 drives the active wheel 134a and the brush 452 on the surface of the worm gear 454 can clean out the residual modeling material on the active wheel 134a.

The exemplary embodiments does not limit the layout between the cleaning unit and the driving wheel set. The designer can modify the layouts in the embodiments of FIGS. 3 and 4. For example, in an embodiment which is not shown here, the cleaning unit can be disposed at the left side of a travel path of the modeling material as shown by FIG. 4 so as to make the worm gear freely coupled to the active wheel 134a. At the time, the second power source 456 in FIG. 4 can be saved, and the worm gear is driven by the active wheel 134a such that the brush is located in the helical tooth groove of the worm gear leaning against and contact with the active wheel 134a to clean out the residual modeling material. Or, the cleaning unit can be disposed at both sides of the travel path of the modeling material 30, at the time, the brush can lean against and contact with both of the active wheel 134a and the passive wheel 134b, which is omitted to describe.

In summary, in the aforementioned embodiments, the 3-D printing apparatus employs a cleaning unit disposed beside the printing assembly and the cleaning unit has a brush able to lean against and contact with the driving wheel set. Thus, the residual modeling material adhered on the driving wheel set can be cleaned out by the brush during the rotation of the driving wheel set, which can effectively avoid the residual modeling material after curing choked in the driving wheel set to trigger abnormal operation.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention. In view of the foregoing, the protective scope of the present invention is given by the following claims and their equivalents.

What is claimed is:

1. A three-dimensional printing apparatus, configured to form a three-dimensional object layer by layer with a modeling material and comprising:
    a printing assembly, comprising a feeding tube, a driving wheel set and a nozzle, wherein the driving wheel set is disposed between the feeding tube and the nozzle to drive the modeling material transferred to the nozzle from the feeding tube and exit from the printing assembly via the nozzle so as to form the three-dimensional object layer by layer; and
    a cleaning unit, having a brush, wherein the brush leans against and contact with the driving wheel set so as to clean out the residual modeling material while the driving wheel set rotates relatively to the cleaning unit.

2. The three-dimensional printing apparatus as claimed in claim 1, wherein the driving wheel set comprises:
    a first power source;
    an active wheel, connected to the first power source; and
    a passive wheel, coupled to the active wheel, wherein the first power source drives the active wheel for rotation, so that the active wheel drives the passive wheel for rotation and transfers the modelling material to the nozzle from the feeding tube.

3. The three-dimensional printing apparatus as claimed in claim 2, wherein a rotation direction of the active wheel is opposite to a rotation direction of the passive wheel.

4. The three-dimensional printing apparatus as claimed in claim 2, wherein the cleaning unit is disposed beside the passive wheel and the brush leans against and contact with the passive wheel.

5. The three-dimensional printing apparatus as claimed in claim 2, wherein the cleaning unit comprises:
    a worm gear, freely coupled to the active wheel or the passive wheel, wherein the brush is disposed on a surface of the worm gear or in a helical tooth groove of the worm gear, and the brush leans against and contact with the active wheel or the passive wheel to clean out the residual modelling material on the active wheel or the passive wheel.

6. The three-dimensional printing apparatus as claimed in claim 5, wherein a rotation axis of the worm gear is orthogonal to a rotation axis of the active wheel or a rotation axis of the passive wheel.

7. The three-dimensional printing apparatus as claimed in claim 2, wherein the cleaning unit comprises:
    a second power source; and
    a worm gear, connected to the second power source, wherein the worm gear is coupled to the active wheel or the passive wheel, the brush is disposed on a surface of the worm gear or in a helical tooth groove of the won't gear, when the first power source is not active, the second power source drives the worm gear for rotation to further drive the active wheel or the passive wheel and the brush cleans out the residual modeling material on the active wheel or the passive wheel.

8. The three-dimensional printing apparatus as claimed in claim 7, wherein a rotation axis of the worm gear is orthogonal to a rotation axis of the active wheel or a rotation axis of the passive wheel.

9. The three-dimensional printing apparatus as claimed in claim 1, further comprising:
    a heating unit, thermally coupled to the feeding tube to fuse or soften the modeling material in the feeding tube.

* * * * *